FILM OF MAGNETO-OPTICAL RARE EARTH OXIDE INCLUDING METHOD THEREFOR

Filed Sept. 8, 1967

INVENTORS
KIE Y. AHN
MERRILL W. SHAFER

BY
Bernard N. Wiener
ATTORNEY

United States Patent Office 3,539,382
Patented Nov. 10, 1970

3,539,382

FILM OF MAGNETO-OPTICAL RARE EARTH OXIDE INCLUDING METHOD THEREFOR

Kie Y. Ahn, Bedford, and Merrill W. Shafer, Yorktown Heights, N.Y., assignors to International Business Machines Corporation, Armonk, N.Y., a corporation of New York Filed Sept. 8, 1967, Ser. No. 668,289
Int. Cl. C23c *13/00*
U.S. Cl. 117—106 17 Claims

ABSTRACT OF THE DISCLOSURE

There is disclosed a ferromagnetic film of EuO doped with ions from the rare earth family to raise the ferromagnetic Curie temperature. By selectively doping EuO films with ions from the rare earth family, the squareness ratio of the hysteresis loop is selectively controlled. This control is obtained by result of change in the magnetostriction of the film. Fabrication of the film and the doping thereof is obtained by vacuum deposition of the composition on a substrate either by successive depositions of different layers of $Eu_2O_3$ and $RE_2O_3$ mixture and Eu metal or by simultaneous deposition of Eu and the mixed oxides, e.g., $Gd_2O_3$ and $Eu_2O_3$ is a suitable mixture. Sources of Eu and mixtures of the oxides $Eu_2O_3$ and $Gd_2O_3$ in 1:1 ratio provide a Gd doped EuO film of the desired composition. The disclosed film is especially suitable for use with a beam addressable memory, as it can readily be operated for writing and reading of magnetic states at 77° K.

BACKGROUND OF INVENTION

This invention relates generally to rare earth oxide film having magneto-optic and ferromagnetic properties and method therefor; it relates more specifically to a film primarily of EuO; and it relates especially to such a film in a beam addressable memory.

In computer technology and other technical arts, there is need for films of material having large magneto-optical effects. In particular, there is presently considerable interest in developing a film primarily of EuO for use in memory applications in computer technology. This use is commonly termed a beam addressable memory, as both light beams and electron beams are utilizable for addressing the memory. For the memory, discrete magnetic regions in the film are established in preferred magnetic orientations by selectively heating them either with a laser beam or with an electron beam. A selected orientation is identified through the manner in which a polarization property of incident light is altered during interaction with a particular magnetic region. The rare earth oxide EuO has been considered to have a desirable characteristic for such a memory application. However, the operational limitations imposed by the requirement to operate at especially low temperatures, in the order of less than 10° K., has severely inhibited the expansion of the beam addressable memory application based upon an application of EuO film. This is because the Curie temperature of EuO is approximately 70° K., and it is necessary to operate at the lower temperatures to obtain the high magnetizations. It has been apparent for some time that were a film primarily of EuO available which could operate at temperature of 77° K. (readily obtainable through use of liquid nitrogen), it would cause rapid involvement of such films in computer technology.

In copending patent application Ser. No. 666,517 now abandoned by F. Holtzberg et al., "Method of Producing High Curie Temperature EuO Single Crystals," filed on the filing date hereof, and assigned to assignee hereof, there is presented data on the effect of a rare earth sesquioxide inclusion in bulk EuO on the ferromagnetic Curie temperature. Illustratively, the ferromagnetic transition temperature $T_c$ of bulk EuO is described in the noted copending application as being increased from 69° K. to 140° K. by reacting Eu, EuO, and the rare earth sesquioxide, e.g., $Gd_2O_3$. The ferromagnetic Curie temperature is a particular temperature above which ferromagnetism disappears.

OBJECTS

It is an object of this invention to provide a ferromagnetic film, primarily of EuO, doped with a member of the group Sc, Y, La, Ce, Pr, Nd, Pm, Sm, Eu, Gd, Tb, Dy, Ho, Er, Tm, Yb, and Lu having relatively large magneto-optical effects and a relatively high ferromagnetic Curie temperature and method of fabrication thereof.

It is another object of this invention to provide a doped EuO film having crystalline structure with a Curie point relatively higher than that of the comparable non-doped film.

It is another object of this invention to provide a doped EuO film having ferromagnetic property capable of altering the polarization property of incident light when reflected or transmitted via a magnetized region of the film.

It is another object of this invention to control both the magnetostriction and the magnetocrystalline anisotropy in a film primarily of EuO having magneto-optical and ferromagnetic properties by doping with other rare earth ions.

It is another object of this invention to provide a film primarily of rare earth oxide characterized as a host crystalline lattice of EuO wherein the magneto-optical and ferromagnetic properties suitable for light response are modified by the presence of a dopant. The dopant specie include a plurality of different members of the rare earth group Sc, Y, La, Ce, Pr, Nd, Pm, Sm, Eu, Gd, Tb, Dy, Ho, Er, Tm, and Lu.

It is another object of this invention to provide material with thin film geometry and light reflection and transmission properties of a thin film primarily of doped EuO, suitable for use in applications requiring a light responsive medium with a response determined by the magneto-optic and ferromagnetic properties of the region upon which the light is incident.

It is another object of this invention to provide a doped EuO film having light-responsive magneto-optic and ferromagnetic properties without introduction into the film of atomic species having alien properties. In particular, the EuO film is doped by atomic weight ratio about in range 1:1000 to 1:10 with trivalent ions with ionic radii within a range of plus or minus about 10 percent that of the ionic radius of the $Eu^{++}$; e.g., $Gd^{+++}$, or it is doped with the metal form thereof which contributes conduction electrons.

The foregoing and other objects, features, and advantages of the invention will be apparent from the following more particular description of preferred embodiments of the invention, as illustrated in the accompanying drawings.

SUMMARY OF INVENTION

Figure 1A:
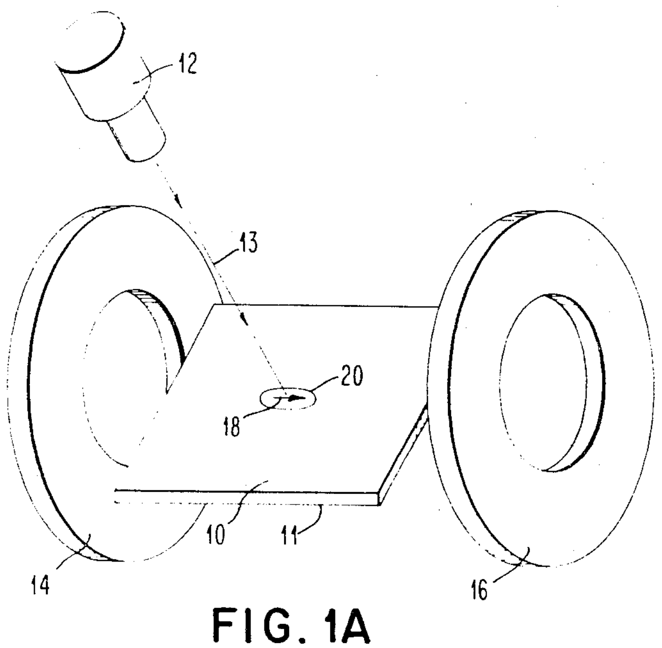
FIG. 1A is a schematic diagram illustrating the writing operation for establishing binary information into a film having magneto-optic and ferromagnetic properties in accordance with this invention.

A film according to this invention has magneto-optic and ferromagnetic properties and is responsive to incident light to alter an optical property thereof. It has a host material primarily of an oxide of a divalent europium Eu, and it has relatively small percent atomic weight configuration of dopant species selected from the group consisting of scandium Sc, yttrium Y, lanthanum La, cerium Ce, praesodymium Pr, neodymium Nd, gadolinium Gd, promethium Pm, samarium Sm, europium Eu, dysprosium Dy, holmium Ho, erbium Er, thulmium Tm, ytterbium Yb, and lutetium Lu.

As shown in a conventional Periodic Table, the normally occurring oxidation states for the members of the group consisting of Sc, Y, La, Ce, Pr, Nd, Pm, Sm, Gd, Tb, Dy, Ho, Er, Tm, Yb, and Lu is three. The contribution of a dopant specie to increasing the ferromagnetic Curie temperature of a film primarily of a rare earth oxide in accordance with this invention does so by contributing conduction electrons to the material. Further, the source of ferromagnetism of an EuO film is a result of the europium ion being divalent. Therefore, a film in accordance with this invention has the predominant host ionic species of the host material in divalent state and the dopant species in a higher positive valence state.

For example, in EuO the oxidation state of Eu is two; and the oxidation state of the dopant Gd is presumed to be three.

A particular film provided by this invention has host crystalline lattice primarily of EuO which is selectively doped with a trivalent ion in selected proportions according to the nature of the magnetostriction required for use of the film. For example, a relatively small number of ions of $Gd^{+++}$ incorporated on lattice sites normally occupied by $Eu^{++}$ ions in crystalline EuO significantly raises the Curie temperature $T_c$ above 69° K., the Curie temperature for pure EuO film, e.g., an atomic relationship of Gd:Eu of 1:100 altering the Curie temperature from about 69° K. to about 140° K. As another example, a relatively small number of excess atomic Eu presumably in interstitial positions raise the $T_c$ from about 69° K. to about 120° K.

EMBODIMENTS OF INVENTION

Exemplary doped films for the practice of this invention are prepared by vacuum deposition from heated sources in a vacuum of $2\times10^{-5}$ mm. of Hg on a heated substrate maintained between 100° C. and 250° C. Illustrative substrates are glass, quartz, and polished silver. In particular, one source of Eu and another source consisting of a mixture of $Eu_2O_3$ and $Gd_2O_3$ are vaporized by electron beam guns in a conventional manner.

Fabrication of a film for the practice of this invention is obtained by multilayering films of Eu and the mixed oxides, e.g., 10 percent $Gd_2O_3$ and 90 percent $Eu_2O_3$, following the subsequent heat of reaction a Gd-doped EuO film is obtained. By simultaneous evaporation of the same components, a similar film is obtained. Similar results are obtained for mixed oxides $Y_2O_3$ and $Eu_2O_3$, and $Ho_2O_3$ and $Eu_2O_3$.

Background information concerning evaporation onto a substrate of a plurality of components is presented in copending patent application Ser. No. 395,718, "Amorphous Alloys," by S. R. Mader et al., filed Sept. 11, 1964, and assigned to the assignee hereof now Pat. 3,427,154.

The following Table I presents data concerning properties of exemplary films prepared in accordance with the practice of this invention. In the table, there are shown parameters of certain properties of a pure EuO film; an Eu-rich film and films developed by vacuum deposition from sources of Eu and mixtures of $Eu_2O_3$ and $Gd_2O_3$, $Eu_2O_3$ and $Y_2O_3$, or $Eu_2O_3$ and $Ho_2O_3$.

TABLE I

Properties of a Film Primarily of EuO

| Properties | Pure | Eu-rich | Dopant Gd, Ho, or Y |
|---|---|---|---|
| $M\left(\frac{emu}{gm}\right)$ | ~195 | ~195 | 212 |
| Resistivity (α—cm.) at 300° K | >10 [6] | ~10 | $2.5\times10^{-2}$ |
| Structure | (1) | (1) | (1) |
| $T_c$ at zero field | ~70 | ~120 | ~140 |
| Optical absorption, at 300° K and λ=6000A, $\alpha_{max}$ ($10^4$/cm.) | ~10 | ~10 | 11.5 |
| Secondary absorption at 6500 A. and 6° K | | | 3,600 |
| Specific faraday rotation (deg./cm.) | $5\times10^5$ | $\sim5\times10^5$ | $\sim5\times10^5$ |
| Longitudinal kerr rotation (deg.) | 2.5 | ~2.5 | 3.6 |
| Transverse kerr effect (percent) | 25 | 25 | 38 |

[1] Rock salt (cubic).

The following Table II provides a tabulation of the oxidation states of the members of the group for the practice of this invention as provided in a conventional Periodic Table.

TABLE II

| Dopant species: | Oxidation state |
|---|---|
| La | 3 |
| Eu | 3, 2 |
| Ce | 3, 4 |
| Pr | 3, 4 |
| Nd | 3 |
| Pm | 3 |
| Sm | 3 |
| Gd | 3 |
| Tb | 3, 4 |
| Dy | 3 |
| Ho | 3 |
| Er | 3 |
| Lu | 3 |
| Y | 3 |
| Sc | 3 |
| Tm | 3 |
| Yb | 3, 2 |

A beam addressable memory may be satisfactorily operated using films prepared in accordance with the practice of this invention. Such a beam addressable memory is present in the following identified copending aplications: Ser. No. 563,553 now abandoned, "Magnetic Recording," filed July 7, 1966 by G. F. Fan; and Ser. No. 563,823 "Beam Addressable Memory File," filed July 8, 1966 by G. F. Fan et al.; both applications being assigned to the assignee hereof. The writing operation for a film in a beam addressable memory is illustrated in FIG. 1A. A film 10 is established on substrate 11. Laser or electron beam source 12 provides focused beam 13 to the upper surface of film 10. A magnetic field source consisting of Helmoholtz coils 14 and 16 establishes a magnetic field 18 in the plane of the film 10 in region 20 thereof. In the presence of a magnetic field of approximately 20 oersteds, the region 20 in film 10 is established with a magnetic film direction pointing to the right to indicate binary information of one type, e.g., binary "1," and with the magnetic field pointing to the left indicating binary bit of opposite nature, e.g., a binary "0." As the region 20 has a significantly higher temperature than the surrounding material as a result of beam 12, it alone is established with a particular magnetic field orientation. Upon cooling, a region 20 is written with binary information such as FIG. 1A is ready for the reading operation as presented in FIG. 1B. The entire surface of film 10 is established selectively with written binary information. Within the state of the art, a region 20 of three microns diameter can readily be established in a selected binary state. Therefore, a film primarily of rare earth oxide, e.g., EuO, doped in accordance with this invention has a large capacity of the order of $10^7$ bits/in.$^2$.

Figure 1B:
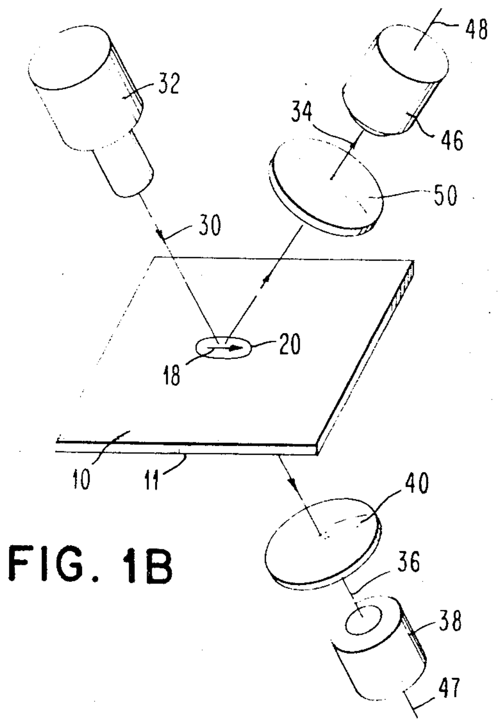
FIG. 1B is a schematic diagram illustrating the reading operation for retrieving information stored as a magnetic orientation via the magneto-optic and ferromagnetic properties in a film in accordance with this invention.

A discussion of the reading operation, i.e., for retrieving binary information, stored in a film 10 as described with reference to FIG. 1A will now be presented with reference to FIG. 1B. In FIG. 1B a Gd doped film 10 primarily of EuO prepared in accordance with the practice of this invention has incident on region 20 thereof a focused light beam 30, from light beam source 32, preferably a focused laser. Conveniently, the light beam 30 can be provided by He-Ne laser emitting light having wavelength 6328 A.

Several magneto-optic effects are readily available for determining the manner in which the interaction of the incident light beam 30 with magnetized region 20 as result of magnetization 18 therein alters the nature of both reflected light 34 and transmitted light 36 from incident light 30. For measurement of the Faraday rotation, the transmitted light 36 is received by a photomultiplier tube 38 via an analyzer 40. The analyzer 40 is set for minimum transmission for a certain direction of the electric field vector of the incident linearly polarized light; and the output on line 47 from photomultiplier tube 38 is a measure of the Faraday rotation.

The longitudinal Kerr effect is measured by photomultiplier tube 46 which provides a measure of the amount of rotation of the polarization after the reflected light 34 from region 20 is passed via analyzer 50. The transverse Kerr effect is measured by the amount of change in the intensity of the reflected light 34 from region 20 as measured by photomultiplier tube 46 in the absence of analyzer 50.

Figure 1C:
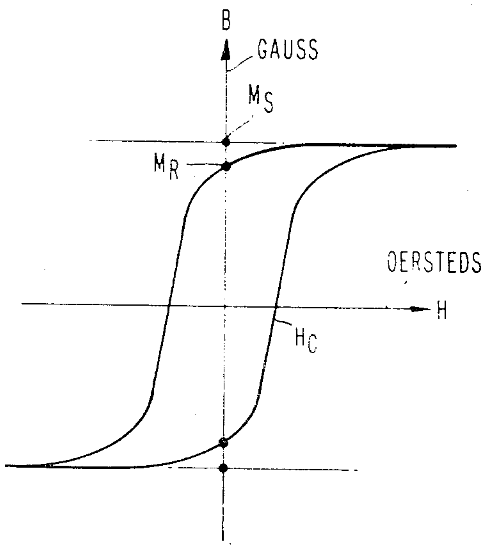
FIG. 1C is a line diagram of an idealized hysteresis loop useful in discussion of the squareness ratio.

The nature of the magnetic hysteresis loop of a film in a beam addressable memory is significant for the practical use of the film. There is illustrated in FIG. 1C an idealized hysteresis loop for film 10. The coercive force $H_C$ is the field required to switch the state of magnetization of region 20, i.e., from a binary "1" with the magnetization pointing to the right to a binary "0" with the magnetization pointing to the left. The squareness ratio $M_R/M_S$, i.e., the ratio of the remanent magnetization to the saturation magnetization is a measure of how well a film will perform in praitical terms.

A switching field $H_C$ of approximately 120 oersteds for a quartz substrate 11, and approximately 60 oersteds for a glass substrate 11, has been readily obtained for a film 10 for writing of binary information as shown in FIG. 1A. By using dopant specie in selected combinations selected from the group consisting of La, Eu, Ce, Pr, Nd, Pm, Sm, Gd, Tb, Dy, Ho, Er, Lu, Y, Sc, Tm and Yb, the squareness ratio $M_R/M_S$ of the films primarily of EuO can be varied. For example, an ion with large spin orbit effects, as presented in the literature, when replacing $Eu^{++}$ in the EuO lattice significantly alters the magnetocrystalline anisotrophy and the magnetostriction. As the nature of the hysteresis loop (FIG. 1C) is related to both the magnetostriction and the magnetocrystalline anisotropy, control of the latter two parameters of a film primarily of EuO controls the squareness ratio.

By the practice of this invention, the squareness ratio $M_R/M_S$ can readily be changed. As noted hereinbefore, this is accomplished by selectively doping a host film primarily of EuO with a particular dopant configuration.

EXPERIMENTS FOR INVENTION

(I) Introduction

There will now be presented discussion of experiments for practice of this invention. The data and the discussion are mainly about the illustrative embodiment of an EuO film doped with Gd to raise the Curie temperature substantially above the about 70° K. value characteristic of a pure EuO film. The resultant film is useful for preferable operations of magneto-optical apparatus at and above the cryogenic temperature of 77° K. of liquid nitrogen.

Studies of interest of rare earth chalcogenides are presented by F. Holtzberg et al. in copending applications, Ser. No. 374,351, now Pat. 3,371,041, "Process for Modifying Curie Temperature of Ferromagnetic Compounds," filed Jun 11, 1964, and Ser. No. 449,780, now abandoned, "Method of Preparing Rare Earth Chalcogenide Flms," filed Apr. 21, 1965, both applications being assigned to the assignee hereof. Other studies of bulk chalcogenides mixed systems are presented in copending applications: Ser. No. 428,862, now Pat. 3,371,042, "Ferromagnetic Materials," filed Jan. 28, 1965; and Ser. No. 666,517, now abandoned, by F. Holtzberg et al., "Method of Producing High Curie Temperature EuO Single Crystals," filed on the date of filing hereof, both applications being assigned to assignee hereof.

An exemplary doped EuO film provided by the practice of this invention is face-centered cubic polycrystalline structure consisting primarily of divalent $Eu^{++}$ with sufficient additional $Gd^{+++}$ (trivalent rare earth) to raise the ferromagnetic Curie temperature $T_C$ by a factor of more than two.

(II) Preparation and physical properties of films

The exemplary films provided herein for the practice of this invention were prepared by vacuum deposition. Suitable films were obtained by both simultaneous deposition from sources of Eu and mixed oxides $Gd_2O_3$ and $Eu_2O_3$ (10 percent by weight of $Gd_2O_3$ and 90 percent by weight of $Eu_2O_3$) or by a multilayering of thin films of Eu and mixed oxides, e.g., each film being approximately 100 A. units followed by subsequent heating for the chemical reaction to produce EuO.

An illustrative vacuum of approximately $10^{-5}$ mm. Hg was used during evaporation of the experimental films. The thickness of the film was monitored during growth by a pair of quartz crystal oscillators in a conventional manner, each quartz crystal observing the amount of deposition from each source. The average rate of evaporation was approximately 3.3 A./sec. The distance between the substrate and the vapor source was approximately 50 cm. A ratio of 1:1 of Eu and the mixed oxides provided a desirable composition. Each substrate, e.g., fused quartz or polished silver, prior to deposition thereof of a film was cleaned in a detergent solution ultrasonically followed by a vapor degreasing. Ordinary glass substrates were heated to 250° C. prior to film deposition.

The crystalline structure of a Gd-doped film, provided by in the practice of this invention, is essentially the same as that of a pure EuO film, as determined by X-ray diffraction measurement. The atomic ratio of Gd to Eu was determined to be approximately 0.013 by X-ray fluorescense. A typical surface micrograph of a cross-section of an exemplary film shows the film is apparently built up with columnar growth with an average diameter of a column estimated to be about 500 A. to 1000 A.

(III) Magnetic properties

Figure 2:
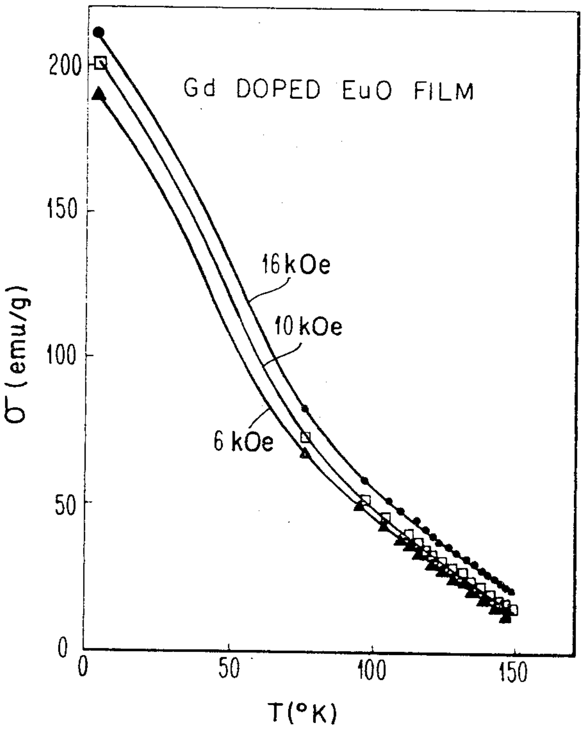
FIG. 2 presents graphs of measurements of magnetic moment versus temperature for an exemplary Gd-doped EuO film in accordance with this invention for several values of magnetic field.

The magnetic moment-temperature measurements of a typical Gd-doped EuO film are shown in FIG. 2. It should be noted that the magnetization extends toward about 160° K. at high applied fields. Magneto-optic measurements at zero field show that the Curie temperature is about 140° K.

(IV) Electrical resistivity

EuO is an insulating compound with a room temperature resistivity of $10^8$ Ω-cm. In bulk samples when trivalent ions of $Gd^{+++}$ are added, the resistivity decreases rapidly to $\sim 10^2$ Ω-cm. as disclosed in copending application Ser. No. 666,517, now abandoned, which is attributed to the conduction electrons on $Gd^{+++}$.

Figure 3:
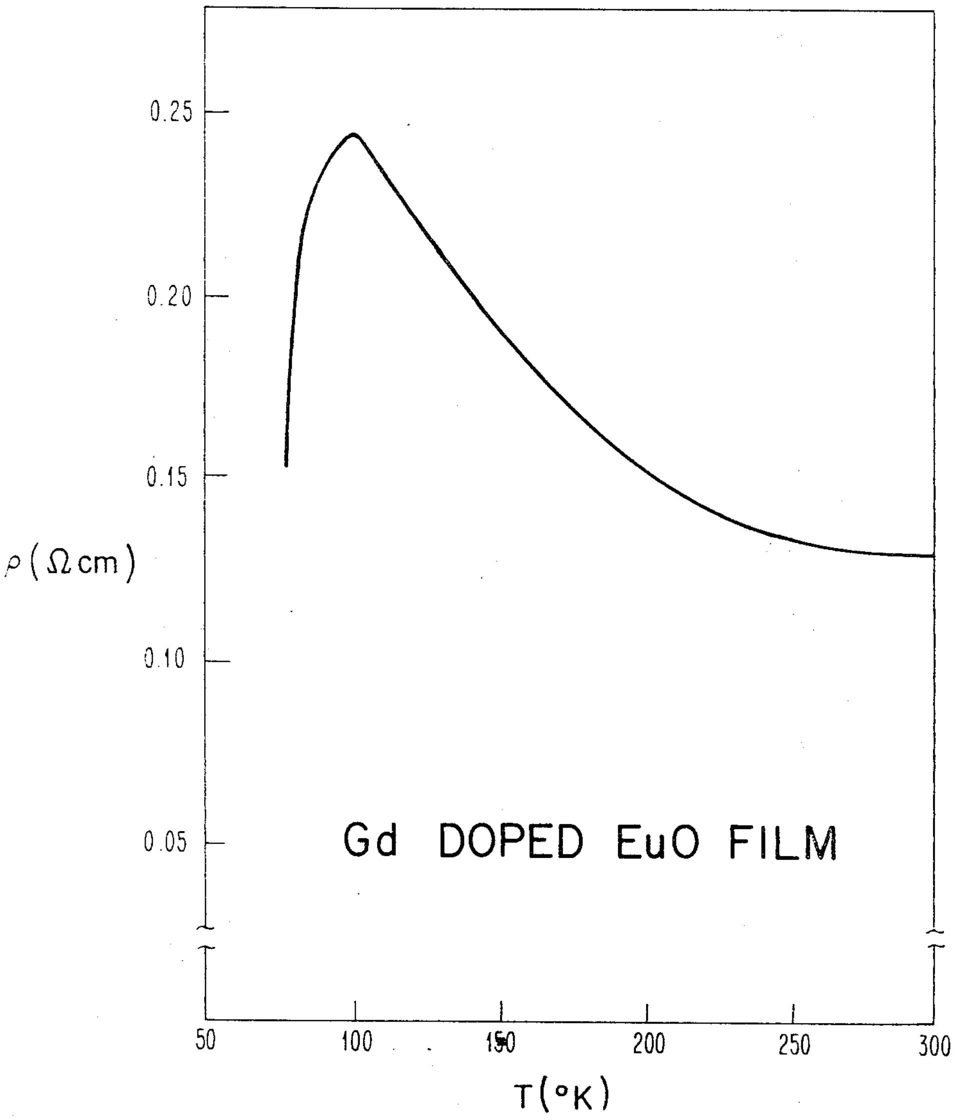
FIG. 3 illustrates the electrical resistivity as a function of temperature for a Gd-doped EuO film according to the practice of this invention.

The resistivity of doped films was measured on substrates on which four gold contacts were predeposited for current and voltage measurements. The temperature dependence of the resistivity is shown in FIG. 3. The maximum value occurs near 100° K. with a resistivity of 0.25 Ω-cm. Thus, as a result of doping thin films of EuO with Gd, the resistivity is decreased by a factor of $10^9$ from that of the pure material (V) Magneto-optic properties Measurements of the longitudinal Faraday rotation, the longitudinal Kerr rotation, and the transverse Kerr effect are used herein (FIG. 4) to characterize the magneto-optic properties of films for practice of this invention.

The longitudinal Faraday rotation $2\phi$ is defined by the rotation when the magnetization is switched from $-M_S$ to $+M_S$. At $H=\pm 400$ oe., $2\phi$ was measured in the wavelength region from 0.4μ to 1.15μ at various temperatures with several different incident angles, $\theta_i$, between the film normal and the incident beam. For a given set of temperatures T and wavelength λ, the rotation increases with increasing $\theta_i$.

Illustratively, for a film with a thickness of 4000 A. at $T=10°$ K. and $\lambda=0.6328\mu$, the rotation increases from 1.7° to 6.8° when the incident angle increases from 10° to 50°. This relationship can be approximated with $\phi=9.5 \sin \theta_i$ for $\theta<50°$.

The specific Faraday rotation, as defined by the ratio of rotation to film thickness, is essentially the same as in pure EuO films. At an incident angle of 20°, doped films have a specific rotation of $1\times 10^5$ deg./cm. From the similarity of the doped and the pure films, the maximum specific rotation for the normal incidence is expected to be $\sim 5\times 10^5$ deg./cm. in doped films.

Figure 5:
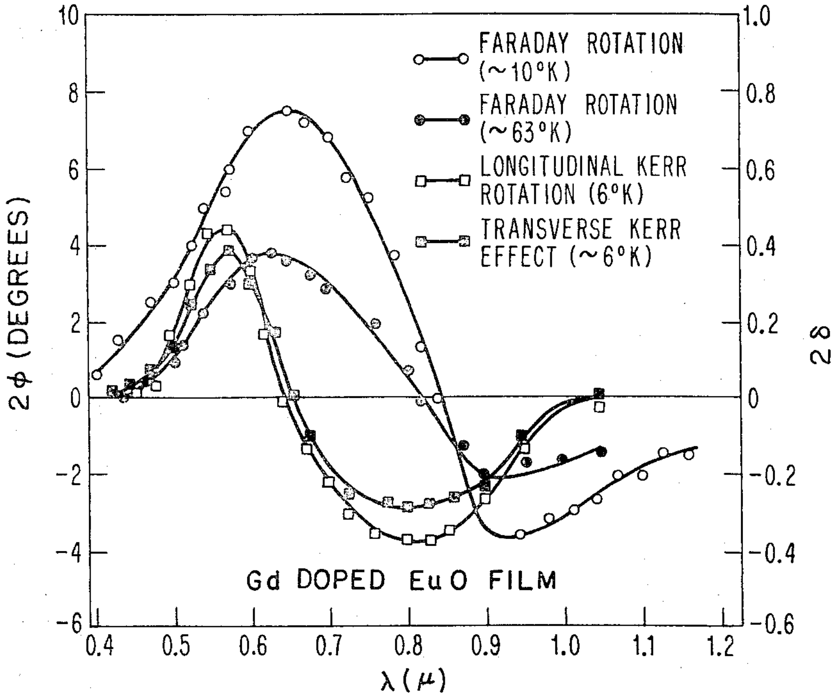
FIG. 5 presents curves of the longitudinal Faraday rotation, the longitudinal Kerr rotation, and the transverse Kerr effect of an exemplary 4000 A.-thick film of EuO doped with Gd in accordance with this invention.

The wavelength dependence of the longitudinal Faraday rotation in a 4000 A. thick film is shown in FIG. 5. In the visible spectrum, there is a peak positive rotation of 7.5° centered around $\lambda=0.65\mu$ at 10° K. (and $\lambda=0.625\mu$ at 63° K.). The rotation reverses sign at approximately $\lambda=0.86\mu$ and reaches a negative maximum of 3.6° at $\lambda=0.93\mu$ at 10° K. and decreases slowly. Shift of the peak rotation with temperature is similar to that of optical absorption to be described later.

The temperature dependence of the Faraday rotation was examined at a fixed incident angle of 20° at $\lambda=0.6328\mu$ using an He–Ne laser. Results are summarized in FIG. 4. The double rotation with remanent magnetization is denoted by $2\phi_R$. The rotation drops off rapidly with increasing temperature. The saturation rotation with an applied field of ±400 oe. extends to 160° K. and the remanent rotation to 140° K.

Figure 4:
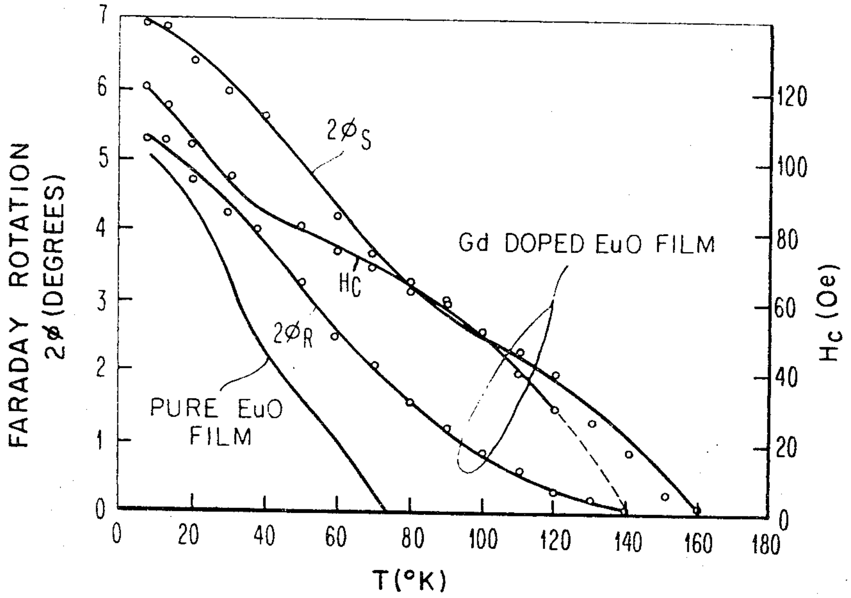
FIG. 4 presents curves of the longitudinal Faraday rotation (both saturation and remanent rotation $2\phi_s$ and $2\phi_r$) and the coercive force $H_c$ versus temperature at a wavelength of 6328 A. for an exemplary Gd-doped EuO film of 4000 A. thickness at an incident angle of 20° in accordance with this invention.

The Kerr effect measurements were performed with a fixed angle of incidence, 45°. The sample was mounted on the bottom of a copper dewar. A thin layer of Ga was established between the substrate and copper surface for good thermal conduction. A liquid nitrogen heat shield was placed in front of the film to shield the film surface. The results of both Kerr effects measured at ~6° K. are also shown in FIG. 4 for comparison purposes with that of Faraday effect. The Kerr effects increase rapidly from zero $\lambda=0.4\mu$ to a positive maximum at $\lambda=0.575\mu$, followed by a rapid decrease. At $\lambda=0.65\mu$, a sign reversal occurs and a rather broad maximum is reached around $\lambda=0.83\mu$. The maximum longitudinal Kerr double rotations are +4.5° and −3.8°.

The transverse Kerr effect $2\delta$ shown in FIG. 5 for linearly polarized P light is defined as the ratio of the reflected intensity variation when the magnetization is reversed from minus to positive saturation at $H=200$ oe. to the reflected intensity of a demagnetized sample. For linearly polarized P light, the electric vector is parallel to the direction of propagation; and for linearly polarized S light, the electric vector is perpendicular to the direction of propagation. For linearly polarized S light, no effect was observed. The maximum values are +0.38 at $\lambda=0.576\mu$ and −0.28 at $\lambda=0.83\mu$ and are larger than for any prior art magneto-optic materials, e.g., for Fe, $2\delta=0.002$, whose Curie temperature is approximately 1000° K.

(VI) Optical absorption

Figure 6:
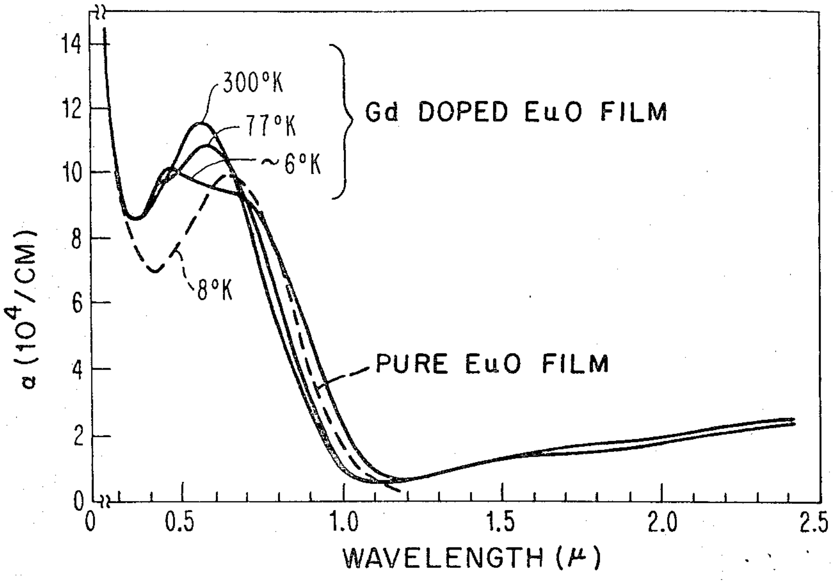
FIG. 6 presents results of optical absorption versus wavelength at three different temperatures for an exemplary film of Gd-doped EuO in accordance with this invention.

In pure EuO, the strong absorption band in the visible spectrum is attributed to an electronic transition, in an exciton-like manner, from $4f$ to $5d$ levels, as shown in FIG. 6 for comparison purpose. Study of optical absorption of doped film deposited on fused quartz was carried out on a spectrophotometer with normal incidence. The absorption of samples was scanned in the wavelength region from 0.3μ to 2.4μ with respect to a reference substrate. FIG. 6 shows results obtained from the same film for which magnetic and magneto-optic properties were presented above. Multiple absorption peaks are present for doped films which become more pronounced at lower temperatures.

In doped films the band-edge shift is very similar to that of pure EuO. However, at temperatures below the ferromagnetic Curie temperature, an absorption band centered around 0.4μ begins to grow at the expense of the major band. The band-edge shift, accompanied by a slight decrease of absorption, toward the red at lower temperature was observed previously in pure bulk EuO where single absorption band appeared down to 8° K.

(VII) Quasistatic switching properties

The quasistatic switching properties of films in accordance with this invention were examined from hysteresis loops. A slowly varying triangular field (whose period is approximately 4 seconds) was applied in the plane of film. The output signal from the detector was displayed onto an oscilloscope.

Hysteresis loops appear similar in shape to those for pure EuO films. The coercive force is independent of thickness in the thickness range up to 1μ. As in the case of pure EuO films, the coercive force is strongly affected by the substrate material. For example, $H_c$ is 120 oe. and 60 oe. on fused quartz and 0080 glass, respectively. The difference arises mainly from the stress in films caused by mismatch of thermal expansion coefficients. The squareness of loops as defined by the ratio of saturation rotation to remanent rotation is 0.75 near 10° K. and decreases to less than 0.5 at 80° K., as derived from data shown in FIG. 5.

PRACTICE OF INVENTION

The practice of this invention includes use of a film in accordance therewith in a beam addressable memory in which the doped film is established in one or more layers contiguous to or approximate to another type magnetic film or films of softer magnetic property. The switching of the softer film during the write operation enhances the switching for the doped film for establishing or changing an information state in the form of a magnetization direction. The practice of this invention encompasses film having a thickness range of about 300 A. to about 50,000 A.

The practice of this invention encompasses a doped film primarily of EuO in the thickness range of about 150 A. to about 50,000 A. However, for a beam addressable memory, a "thin" film is preferable, of thickness of the order of about 1000 A. to about 4000 A.

While the invention has been particularly shown and described with reference to preferred embodiments thereof, it will be understood by those skilled in the art that the foregoing and other changes in form and details may be made therein without departing from the spirit and scope of the invention.

We claim:

1. An article comprising:
- a substrate;
- a host crystalline lattice structure coating on said substrate primarily of EuO;
- a dopant configuration of at least one dopant uniformly dispersed in said host structure selected from the group consisting of Sc, Y, La, Ce, Pr, Nd, Pm, Sm, Eu, Gd, Tb, Dy, Ho, Er, Tm, Yb, and Lu in atomic relationship to said Eu in the range from about 1:1000 to about 1:10.

2. An article as set forth in claim 1 wherein said dopant is Gd in atomic relationship to said Eu in the range from about 1:1000 to about 1:10.

3. An article as set forth in claim 1 wherein said structure is polycrystalline.

4. An article as set forth in claim 1 wherein said coating has a thickness in the range of about 150 A. to about 50,000 A.

5. An article as set forth in claim 1 wherein said dopant atomic species is dispersed in said host lattice in ionic form with valence of at least plus three.

6. An article as set forth in claim 1 wherein said dopant atomic species is Gd, said host atomic species is Eu, and said ratio relationship therebetween is 1:100.

7. An article having magneto-optic and ferromagnetic properties for mode conversion of incident light according to the magnetic state of the local region upon which the light is incident comprising:
- a substrate;
- a host crystalline lattice of EuO established in coating form on said substrate;
- a uniform distribution of at least one dopant $(RE)^{+++}$ selected from the group consisting of Sc, Y, La, Ce, Pr, Nd, Pm, Gd, Tb, Dy, Ho, Er, Tm, Tb, and Lu in said crystalline lattice on sites normally occupied by Eu atoms and
- said $RE^{+++}$ being present relative to said Eu in an atomic ratio relationship in the range of about 1:1000 to about 1:10.

8. An article as set forth in claim 7 wherein said $RE^{+++}$ is $Gd^{+++}$.

9. Method for controlling the ferromagnetic Curie temperature in a coating of a rare earth oxide where the host rare earth is divalent comprising the steps of:
- establishing a substrate;
- depositing a coating of said rare earth oxide on said substrate; and
- depositing uniformly dopant $(RE)^{+++}$ in said coating in an atomic ratio relationship $(RE)^{+++}$:Eu in the range of about 1:1000 to about 1:10 where $RE^{+++}$ is a configuration of at least one specie taken from the group consisting of Sc, Y, La, Ce, Pr, Nd, Pm, Sm, Gd, Tb, Dy, Ho, Er, Tm, Yb, and Lu;
- said depositing of said coating and said dopant being in vacuum of at least approximately $2\times10^{-5}$ mm. of Hg on said substrate heated approximately in the range 100° C. to 250° C.

10. Method as set forth in claim 9 wherein said host rare earth oxide is EuO and said dopant is Gd.

11. Method for altering the squareness ratio of a crystalline coating primarily of rare earth oxide having magneto-optic and ferromagnetic properties comprising the steps of:
- establishing a substrate;
- depositing a coating of a rare earth oxide primarily of EuO on said substrate; and
- depositing uniformly a configuration of dopant atoms in said coating said dopant configuration including selected proportions of a plurality of different atoms of different ionic species selected from the group Sc, Y, La, Ce, Pr, Nd, Pm, Sm, Gd, Tb, Dy, Ho, Er, Tm, Yb, and Lu;
- said depositing of said coating and of said dopant being in vacuum of at least approximately $10^{-5}$ mm. of Hg on said substrate which is heated approximately in the range 100° C. to 250° C.

12. Method according to claim 11 wherein said host rare earth oxide is EuO and said dopant is selected from the group consisting of Gd, Ho and Y.

13. Method for establishing a doped film having magneto-optic and ferromagnetic properties with relatively high Curie temperature comprising the steps of:
- establishing a substrate;
- evaporating onto said substrate Eu and oxides $Eu_2O_3$ and $RE_2O_3$ where RE is selected from the group consisting of Sc, Y, La, Ce, Pr, Nd, Pm, Sm, Eu, Gd, Tb, Dy, Ho, Er, Tm, Yb, and Lu from heated sources thereof to produce a doped film of EuO on said substrate by chemical reaction of said Eu and said oxides;
- said evaporating being in vacuum of at least approximately $2\times10^{-5}$ mm. of Hg on said substrate heated approximately in the range 100° C. to 250° C.

14. Method for establishing a doped coating having magneto-optic and ferromagnetic properties with relatively high Curie temperature comprising the steps of:
- establishing a substrate;
- evaporating onto said substrate Eu and oxides $Eu_2O_3$ and $RE_2O_3$ where RE is selected from the group consisting of Gd, Ho, and Y from heated sources thereof to produce a doped coating of EuO on said substrate by chemical reaction of said Eu and said oxides;
- said evaporating being in vacuum of at least approximately $2\times10^{-5}$ mm. of Hg on said substrate heated approximately in the range 100° C. to 250° C .

15. Method according to claim 14 wherein said evaporating of Eu and mixed oxides is simultaneous onto said substrate.

16. Method according to claim 14 wherein said evaporation is in successive alternate layers of said Eu and said mixture of said oxides.

17. Method according to claim 16 wherein said alternate layers are approximately 100 A. thick.

References Cited

UNITED STATES PATENTS

| | | | |
|---|---|---|---|
| 3,234,494 | 2/1966 | Matthias | 252—62.51 X |
| 3,371,041 | 2/1968 | Holtzberg | 252—62.51 |
| 3,371,042 | 2/1968 | McGuire et al. | 252—62.51 |
| 3,376,157 | 4/1968 | Guerci et al. | 117—235 |
| 3,418,036 | 12/1968 | Holtzberg | 252—62.51 X |

ALFRED L. LEAVITT, Primary Examiner

A. GRIMALDI, Assistant Examiner

U.S. Cl. X.R.

117—107, 201, 238; 252—62.55